United States Patent
Wu et al.

(10) Patent No.: US 12,519,105 B2
(45) Date of Patent: Jan. 6, 2026

(54) POSITIVE ELECTRODE MATERIAL AND ELECTROCHEMICAL DEVICE INCLUDING SAME

(71) Applicant: Ningde Amperex Technology Limited, Ningde (CN)

(72) Inventors: Xia Wu, Ningde (CN); Kai Wang, Ningde (CN); Leimin Xu, Ningde (CN); Meng Wang, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 908 days.

(21) Appl. No.: 17/709,066

(22) Filed: Mar. 30, 2022

(65) Prior Publication Data

US 2022/0223862 A1    Jul. 14, 2022

Related U.S. Application Data (63) Continuation of application No. PCT/CN2020/094912, filed on Jun. 8, 2020.

(51) Int. Cl.
*H01M 4/525* (2010.01)
*C01G 51/42* (2025.01)
*H01M 4/02* (2006.01)
*H01M 10/0525* (2010.01)

(52) U.S. Cl.
CPC ........... *H01M 4/525* (2013.01); *C01G 51/42* (2013.01); *H01M 10/0525* (2013.01); *H01M 2004/021* (2013.01); *H01M 2004/028* (2013.01)

(58) Field of Classification Search
CPC .................................................... H01M 4/525
See application file for complete search history.

(56) References Cited

U.S. PATENT DOCUMENTS

| | | | |
|---|---|---|---|
| 6,040,090 A * | 3/2000 | Sunagawa | C01G 53/42 429/231.95 |
| 2011/0244332 A1 * | 10/2011 | Saito | H01M 4/505 429/224 |
| 2014/0079990 A1 | 3/2014 | Yanagida et al. | |
| 2015/0132666 A1 | 5/2015 | Ogata et al. | |

(Continued)

FOREIGN PATENT DOCUMENTS

| CN | 105940534 A | 9/2016 |
|---|---|---|
| CN | 107017405 A | 8/2017 |

(Continued)

OTHER PUBLICATIONS

Li et al. "Designing high-voltage and high-rate Li1—xNaxCoO2 by enlarging Li layer spacing." Electrochimica Acta 273 (2018): 145-153. (Year: 2018).*

(Continued)

*Primary Examiner* — Allison Bourke
*Assistant Examiner* — Kayla Elaine Clary
(74) *Attorney, Agent, or Firm* — WHDA, LLP (57) ABSTRACT

A positive electrode material contains $Li_xNa_zCo_{1-y}M_yO_2$, where $0.6<x<0.85$, $0\leq y<0.15$, $0\leq z<0.03$, and M is at least one selected from Al, Mg, Ti, Mn, Fe, Ni, Zn, Cu, Nb, Cr, or Zr. Under a high voltage (greater than 4.6 V). The positive electrode material exhibits a considerable discharge capacity and desirable structural reversibility and cycle stability.

16 Claims, 5 Drawing Sheets

(56) References Cited

U.S. PATENT DOCUMENTS

| | | | |
|---|---|---|---|
| 2015/0236378 A1* | 8/2015 | Kuwajima | H01M 4/525 |
| | | | 429/188 |
| 2016/0056460 A1 | 2/2016 | Kawada et al. | |
| 2016/0218365 A1 | 7/2016 | Yamamoto | |
| 2016/0351901 A1 | 12/2016 | Saito | |
| 2018/0062173 A1 | 3/2018 | Jo et al. | |

FOREIGN PATENT DOCUMENTS

| | | | |
|---|---|---|---|
| CN | 107369815 A | | 11/2017 |
| CN | 107799733 A | | 3/2018 |
| CN | 107863526 A | | 3/2018 |
| CN | 109761287 A | | 5/2019 |
| JP | WO2012165207 A1 | | 2/2015 |
| JP | WO2015115025 A1 | | 8/2015 |
| WO | 2020/112813 A1 | | 6/2020 |

OTHER PUBLICATIONS

Paulsen et al. "Layered LiCoO2 with a different oxygen stacking (O2 structure) as a cathode material for rechargeable lithium batteries." Journal of the Electrochemical Society 147.2 (2000): 508. (Year: 2000).*

Extended (Supplementary) European Search Report dated Oct. 4, 2022, issued in counterpart application No. 20940315.3. (9 pages).

Office Action dated Oct. 25, 2022 issued in counterpart JP application No. 2021-552975, with English translation. (7 pages).

Office Action dated Feb. 7, 2023 issued in counterpart JP application No. 2021-552975, with English translation. (4 pages).

Office Action dated Jul. 18, 2023 issued in counterpart JP application No. 2021-552975, with English translation. (4 pages).

International Search Report dated Jan. 27, 2021, issued in counterpart International application No. PCT/CN2020/094912, with English translation. (8 pages).

Decision of Refusal dated Jan. 2, 2024, issued in counterpart CN Application No. 202080082803.X. (4 pages).

Office Action dated Feb. 3, 2023, issued in counterpart CN Application No. 202080082803.X. (7 pages).

Office Action dated Aug. 13, 2023, issued in counterpart CN Application No. 202080082803.X. (5 pages).

Fang, L., Electrochemical Energy Storage Devices and Key Materials, 6. Lithium-Ion Battery Cathode Materials, Metallurgical Industry Press, Jul. 2019, wtih English translation. (5 pages); cited in CN Office Action dated Aug. 13, 2023.

Wang, D., Lithium-ion Battery High-voltage Ternary Cathode Materials: Synthesis and Modification, Metallurgical Industry Press, Mar. 2019, with English translation. (5 pages); cited in CN Office Action dated Aug. 13, 2023.

Wang, M. et al., New Energy Introduction, Metallurgical Industry Press, May 2014, with English translation. (6 pages); cited in CN Office Action dated Aug. 13, 2023.

* cited by examiner

POSITIVE ELECTRODE MATERIAL AND ELECTROCHEMICAL DEVICE INCLUDING SAME

CROSS REFERENCE TO RELATED APPLICATIONS

This application is the National Stage application of PCT international application: PCT/CN2020/094912, filed on Jun. 8, 2020, the disclosure of which is hereby incorporated by reference in its entirety.

TECHNICAL FIELD

This application relates to the field of energy storage, and in particular, to a positive electrode material and an electrochemical device containing same, especially a lithium-ion battery.

BACKGROUND

With popularization of electronic products such as a notebook computer, a mobile phone, a handheld game console, and a tablet computer, people are posing higher requirements on the battery of the products. Among multitudinous batteries, lithium-ion batteries are widely used in fields such as portable electronic products, electric transportation, national defense, aviation, and energy reserve by virtue of advantages such as a high energy storage density, a high power density, high safety, environmental friendliness, a long service life, a low self-discharge rate, and adaptability to a wide range of temperatures. As an important component of a lithium-ion battery, a positive electrode material exerts a significant impact on the performance of the battery. Therefore, it is essential to optimize and improve the positive electrode material continuously. With the upgrade of electronic products, the pursuit of a high energy density and a high power density has become a development trend of the positive electrode material of the lithium-ion battery. As the earliest commercialized lithium-ion positive electrode material, lithium cobaltate has been researched in depth extensively, and achieves the best overall performance in terms of reversibility, discharge capacity, charging efficiency, voltage stability, and the like. The lithium cobaltate is a positive electrode material most massively used in the lithium-ion batteries currently. After decades of development, structural characteristics and electrochemical properties of the lithium cobaltate have been researched thoroughly, and a synthesis process and industrial production of the lithium cobaltate have become quite mature. By virtue of a relatively high discharge voltage plateau and a relatively high energy density, the lithium cobaltate has always been in a dominant position in the positive electrode materials of the consumer lithium-ion batteries.

Currently, the $LiCoO_2$ positive electrode material, which is commercially used in the largest quantity in the 3C field, possesses an O3 phase structure, a theoretical capacity of 273.8 mAh/g, excellent cycling and safety performance, and a high compacted density, and is simple to prepare. Since commercialization by Sony in 1991, the $LiCoO_2$ positive electrode material has always been in a dominant position in the market of lithium-ion battery materials. To achieve a higher specific capacity, $LiCoO_2$ is evolving toward high voltage (higher than 4.6 V vs. $Li/Li^+$). When $LiCoO_2$ is charged until a voltage of 4.5 V, the capacity can merely reach 190 mAh/g. People attempt to achieve a higher specific capacity by deintercalating more $Li^+$ from a crystal structure. However, as the voltage further increases, a large quantity of $Li^+$ is deintercalated, and the crystal structure will undergo a series of irreversible phase transitions (from an O3 phase to an H1-3 phase, from an H1-3 phase to an O1 phase), thereby greatly reducing the cycle performance and safety performance of the material. In addition, side reactions at an interface increase under a high voltage, and cobalt metal is dissolved out severely. However, a high-voltage electrolytic solution technology is hardly adaptable, a conventional electrolytic solution under a high voltage decomposes and fails more quickly, thereby leading to drastic capacity attenuation.

Therefore, it is urgent to work out a positive electrode material characterized by a high specific capacity, a high voltage plateau, high structural reversibility, and a steady interface under high voltage for lithium-ion batteries.

SUMMARY

An objective of this application is to disclose a new positive electrode material with an excellent cycle life for a lithium-ion battery. The material contains a lithium-cobalt composite oxide that possesses an O2 phase. The material exhibits excellent structural reversibility and cycle stability under a high voltage (greater than 4.6 V).

In an embodiment, this application discloses a positive electrode material, including $Li_xNa_zCo_{1-y}M_yO_2$, where $0.6<x<0.85$, $0\leq y<0.15$, $0\leq z<0.03$, and M is at least one selected from Al, Mg, Ti, Mn, Fe, Ni, Zn, Cu, Nb, Cr, or Zr.

In some embodiments, pores exist on a surface of particles of the positive electrode material; gaps exist inside the particles of the positive electrode material.

The positive electrode material disclosed in this application, suppresses crystal structure collapse and interface failure of a conventional $LiCoO_2$ material during charging (>4.6 V vs. $Li/Li^+$). The material exhibits desirable structural reversibility and cycle stability under a high voltage, and advantages of the material include but are not limited to: (1) during lithiation, lithium vacancies exist in a crystal structure of the $Li_xNa_zCo_{1-y}M_yO_2$ positive electrode material, and can well allow for volume changes and more lithium to be intercalated; (2) during delithiation/lithiation, pores and gaps exist in the $Li_xNa_zCo_{1-y}M_yO_2$ positive electrode material can effectively release a huge stress formed during high-voltage delithiation/lithiation, suppress irreversible slippage between layers, and achieve good cycle performance; (3) when the voltage is greater than 4.7 V, the $Li_xNa_zCo_{1-y}M_yO_2$ positive electrode material has implemented 95% of delithiation, and therefore, the requirements posed by the positive electrode material on an oxidation-resistant (high-voltage) electrolytic solution are lower than the requirements imposed by the $O_3$ phase; (4) a tiny amount of Na is introduced during synthesis of the $Li_xNa_zCo_{1-y}M_yO_2$ positive electrode material, the Na occupies some sites of Li, and serves as a pillar to support the crystal structure, and can enhance the structural stability of the material; (5) lithium ion migration energy of the $Li_xNa_zCo_{1-y}M_yO_2$ positive electrode material is lower than that of the O3 phase $LiCoO_2$; and (6) a preferred element M introduced in the $Li_xNa_zCo_{1-y}M_yO_2$ positive electrode material can increase structural stability to some extent.

In some embodiments, in an X-ray diffraction analysis (XRD) pattern of the positive electrode material, a (002) crystal plane is located between 17.5° and 19°, and a full width at half maximum thereof falls between 0.05 and 0.1.

In some embodiments, an average particle diameter of the positive electrode material is 8 μm to 30 μm, and a tapped density of the positive electrode material is 2.2 g/cm³ to 3 g/cm³.

In some embodiments, in a differential scanning calorimetry (DSC) pattern of the positive electrode material, an exothermic peak exists between 250° C. and 400° C., and a full width at half maximum of the exothermic peak falls between 15° C. and 40° C.

In some embodiments, the present invention discloses an electrochemical device. The electrochemical device includes a positive electrode. The positive electrode includes a current collector and a positive active material layer coated on at least one surface of the current collector. The positive active material layer includes a positive electrode material, the positive electrode material contains $Li_xNa_zCo_{1-y}M_yO_2$, where $0.6<x<0.85$, $0\leq y<0.15$, $0\leq z<0.03$, and M is at least one selected from Al, Mg, Ti, Mn, Fe, Ni, Zn, Cu, Nb, Cr, or Zr. Particles of the positive electrode material include porous particles.

In some embodiments, a compacted density of the positive active material layer is 4.0 g/cm³ to 4.35 g/cm³.

In some embodiments, the positive electrode satisfies at least one of conditions (a) to (c): (a) in a fully discharged state after a 20th cycle, in an X-ray diffraction analysis (XRD) pattern of the positive electrode material, two peaks appear in a range of 17° to 19°, a peak position difference between the two peaks is 0.5° to 1°, and a peak intensity ratio of a low-angle peak to a high-angle peak is 0 to 1; (b) in a cyclic voltammetry curve of the positive electrode material between a 0th cycle and a 100th cycle, an oxidation peak exists between 4.45 V and 4.55 V, and a reduction peak exists between 4.55 V and 4.65 V; and (c) when voltage reaches 4.7 V during charging, a delithiation percentage of the positive electrode material exceeds 95%.

In some embodiments, when the electrochemical device adopts a lithium-rich negative electrode, after electrochemical lithiation, $0.6<x<1$.

In some embodiments, the present invention discloses an electronic device, including any of the electrochemical devices described above.

Additional aspects and advantages of the embodiments of this application will be described or illustrated in part later herein or expounded through implementation of the embodiments of this application.

BRIEF DESCRIPTION OF DRAWINGS

For ease of describing the embodiments of this application, the following outlines the drawings needed for describing the embodiments of this application. Apparently, the drawings outlined below are merely a part of embodiments in this application. Without making any creative efforts, a person skilled in the art can still obtain the drawings of other embodiments according to the structures illustrated in these drawings.

DETAILED DESCRIPTION

Embodiments of this application will be described in detail below. The embodiments of this application are not to be construed as a limitation on this application.

The term "approximately" used this application is intended to describe and represent small variations. When used with reference to an event or situation, the terms may denote an example in which the event or situation occurs exactly and an example in which the event or situation occurs very approximately. For example, when used together with a numerical value, the term may represent a variation range falling within ±10% of the numerical value, such as ±5%, ±4%, ±3%, ±2%, ±1%, ±0.5%, ±0.1%, or ±0.05% of the numerical value.

In addition, a quantity, a ratio, or another numerical value is sometimes expressed in a range format herein. Understandably, such a range format is for convenience and brevity, and shall be flexibly understood to include not only the numerical values explicitly specified and defined in the range, but also all individual numerical values or sub-ranges covered in the range as if each individual numerical value and each sub-range were explicitly specified.

In the description of specific embodiments and claims, a list of items referred to by using the terms such as "one of", "one thereof", "one type of" or other similar terms may mean any one of the listed items. For example, if items A and B are listed, the phrase "one of A and B" means A alone, or B alone. In another example, if items A, B, and C are listed, then the phrases "one of A, B, and C" and "one of A, B, or C" mean: A alone; B alone; or C alone. The item A may include a single element or a plurality of elements. The item B may include a single element or a plurality of elements. The item C may include a single element or a plurality of elements.

In the description of embodiments and claims, a list of items referred to by using the terms such as "at least one of", "at least one thereof", "at least one type of" or other similar terms may mean any combination of the listed items. For example, if items A and B are listed, the phrases "at least one of A and B" and "at least one of A or B" mean: A alone; B alone; or both A and B. In another example, if items A, B, and C are listed, the phrases "at least one of A, B, and C" and "at least one of A, B, or C" mean: A alone; B alone; C alone; A and B (excluding C); A and C (excluding B); B and C (excluding A); or all of A, B, and C. The item A may include a single element or a plurality of elements. The item B may include a single element or a plurality of elements. The item C may include a single element or a plurality of elements.

I. Positive Electrode Material

According to a first aspect of the present invention, a positive electrode material is disclosed, including $Li_xNa_zCo_{1-y}M_yO_2$, where $0.6<x<0.85$, $0\leq y<0.15$, $0\leq z<0.03$, and M is at least one selected from Al, Mg, Ti, Mn, Fe, Ni, Zn, Cu, Nb, Cr, or Zr.

In some embodiments, x is 0.61, 0.63, 0.65, 0.67, 0.69, 0.71, 0.72, 0.73, 0.74, 0.75, 0.8, or 0.85, or a range formed by any two thereof. In some embodiments, $0.7\leq x<0.75$.

In some embodiments, y is 0.0002, 0.0004, 0.0006, 0.0008, 0.001, 0.002, 0.004, 0.005, 0.006, 0.008, 0.009, 0.014, 0.015, 0.016, 0.017, 0.019, 0.02, 0.025, 0.3, 0.4, 0.5, 0.6, 0.7, 0.8, 0.9, 1, or 1.2, or a range formed by any two thereof.

In some embodiments, z is 0, 0.002, 0.003, 0.004, 0.006, 0.005, 0.008, 0.01, 0.015, or 0.02, or a range formed by any two thereof.

In some embodiments, M is at least one selected from Al, Mg, or Ti. In some embodiments, M is Al. In some embodiments, M is Al and Mg, or is Al and Ti, or is Al, Mg, and Ti.

Figure 3A:
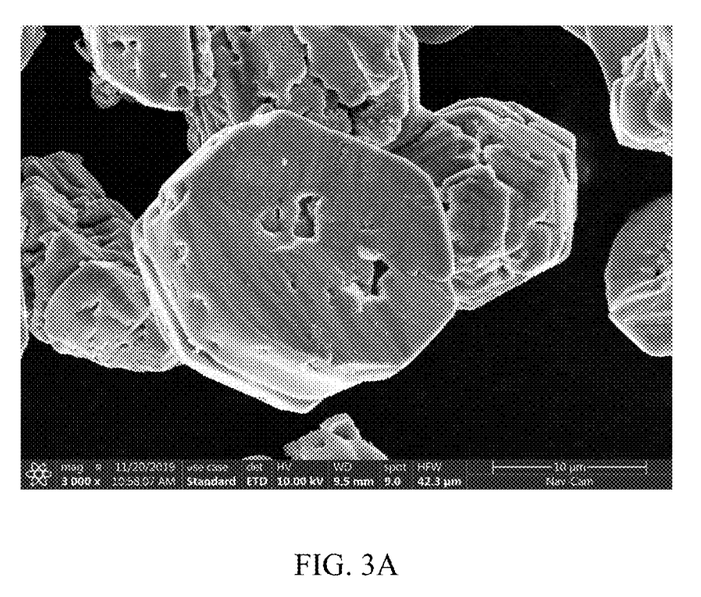
FIG. 3A and FIG. 3B are a scanning electron microscope (SEM) image and a CP-SEM image of particles of a positive electrode material according to Embodiment 1 of this application respectively.
Figure 3B:
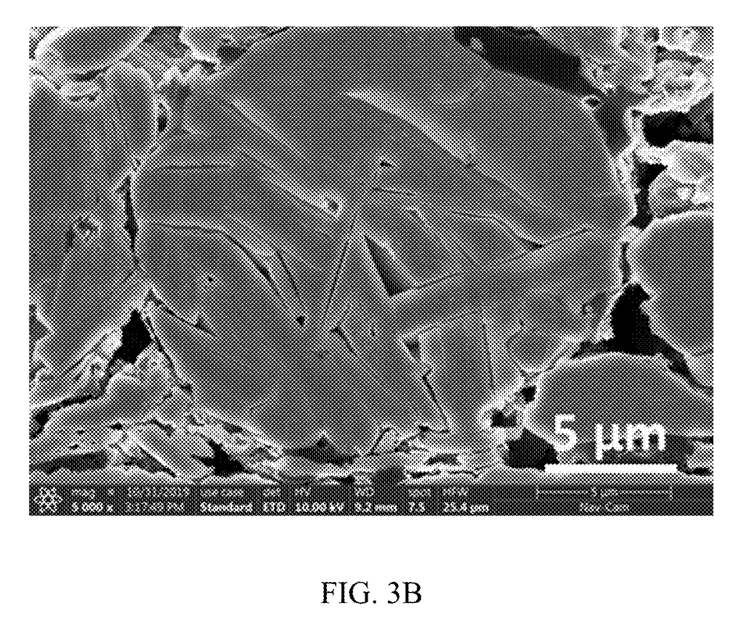

In some embodiments, particles of the positive electrode material are pores (shown in FIG. 3A), and gaps (shown in FIG. 3B) exist in the particles of the positive electrode material. In some embodiments, the quantity of the pores on the particles is M, 0<M<20, the quantity of the gaps inside the particles is N, and 0<N<30. In some embodiments, the quantity of the pores on a surface of each particle of the positive electrode material is 1, 2, 5, 10, or 15, or a range formed by any two thereof; and the quantity of the gaps inside each particle is 4, 8, 12, 16, 20, or 25, or a range formed by any two thereof. The quantity of the pores on the surface of the particle is obtained by averaging the quantities of the pores on the surfaces of a given number of particles after the particles are imaged by using SEM, and the quantity of the gaps inside the particles is obtained by averaging the quantities of the gaps inside a given number of particles after the particles are cut by using a CP (cross-section polishing, cross-section polishing) technology and then imaged by using SEM. In some embodiments, in an X-ray diffraction analysis (XRD) material pattern of the positive electrode material, a (002) crystal plane is located between 17.5° and 19°, and a full width at half maximum thereof falls between 0.05 and 0.1. The SEM is a process of performing interaction between an electron beam and a sample to obtain a morphology of the sample by using secondary electron signal imaging. The scanning electron microscope used in this embodiment is a JSM-6360LV model manufactured by JEOL and a corollary X-ray energy dispersive spectrometer, and is used to analyze the morphology and element distribution of the sample.

In some embodiments, the average particle diameter D50 of the positive electrode material is 8 μm to 30 μm, and specifically may be 8 μm, 9 μm, 10 μm, 11 μm, 12 μm, 13 μm, 14 μm, 16 μm, 18 μm, 20 μm, 22 μm, 24 μm, 26 μm, or 28 μm, or a range formed by any two thereof. The average particle diameter D50 of the positive electrode material particles may be measured by using a Malvern particle size analyzer according to the following method: dispersing the positive electrode material into a dispersant (ethanol or acetone, or another surfactant), performing ultrasonication for 30 minutes, and then adding the sample into the Malvern particle size analyzer to start testing.

In some embodiments, the tapped density of the positive electrode material is 2.2 g/cm³ to 3 g/cm³, and specifically may be 2.2 g/cm³, 2.3 g/cm³, 2.4 g/cm³, 2.5 g/cm³, 2.6 g/cm³, 2.7 g/cm³, 2.8 g/cm³, or 2.9 g/cm³, or a range formed by any two thereof. The tapped density is obtained according to the following method: operating an experimental instrument FZS4-4B automatic tap densitometer, and putting a sample of the to-be-tested object into a 25 mL standard tapping graduated cylinder, tapping the sample for 3000 times, and recording the tapped density.

In some embodiments, in a differential scanning calorimetry (DSC) pattern of the positive electrode material, an exothermic peak exists between 250° C. and 400° C., and a full width at half maximum of the exothermic peak falls between 15° C. and 40° C.

In some embodiments, an exothermic peak of the positive electrode material exists between 330° C. and 360° C.

II. Electrochemical Device

According to a second aspect of this application, this application discloses an electrochemical device. The electrochemical device includes a positive electrode. The positive electrode includes a current collector and a positive active material layer coated on at least one surface of the current collector. The positive active material layer includes any positive electrode material disclosed herein. For example, the positive electrode material includes $Li_xNa_zCo_{1-y}M_yO_2$, where $0.6<x<0.85$, $0\leq y<0.15$, $0\leq z<0.03$, M is at least one selected from Al, Mg, Ti, Mn, Fe, Ni, Zn, Cu, Nb, Cr, or Zr. Particles of the positive electrode material include porous particles.

The value of x in the positive electrode material varies depending on whether the battery is being charged or discharged and whether the active material contains a lithium-rich material.

In some embodiments, a compacted density of the positive active material layer is 4.2 g/cm³ to 4.35 g/cm³.

In some embodiments, the positive electrode satisfies at least one of conditions (a) to (c): (a) in a fully discharged state after a 20th cycle, in an X-ray diffraction analysis (XRD) pattern of the positive electrode material, two peaks appear in a range of 17° to 19°, a peak position difference between the two peaks is 0.5° to 1°, and a peak intensity ratio of a low-angle peak to a high-angle peak is 0 to 1; (b) in a cyclic voltammetry curve of the positive electrode material between a 0th cycle and a 100th cycle, an oxidation peak exists between 4.45 V and 4.55 V, and a reduction peak exists between 4.55 V and 4.65 V; and (c) when voltage reaches 4.7 V during charging, a delithiation percentage of the positive electrode material exceeds 95%. The delithiation percentage is a ratio of the charge capacity obtained after the electrochemical device is charged until a voltage of 4.7 V to the charge capacity obtained after the electrochemical device is charged until a voltage of 4.8 V.

In some embodiments, when the electrochemical device adopts a lithium-rich negative electrode, after electrochemical lithiation, $0.6<x<1$.

The electrochemical device includes any device in which an electrochemical reaction occurs. In some embodiments, the electrochemical device according to the present invention includes, but is not limited to: any type of primary battery, secondary battery, fuel battery, solar battery, or capacitor.

In some embodiments, the electrochemical device is a lithium secondary battery.

In some embodiments, the lithium secondary battery includes, but is not limited to, a lithium metal secondary battery, a lithium-ion secondary battery, a lithium polymer secondary battery, or a lithium-ion polymer secondary battery.

III. Electronic Device

According to a third aspect of the present invention, the present invention discloses an electronic device. The electronic device may be any device that uses the electrochemical device according to the embodiments of this application.

In some embodiments, the electronic device includes, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, or the like.

IV. Method for Preparing an Electrochemical Device

According to a fourth aspect of the present invention, the present invention discloses a method for preparing any of the electrochemical devices described above.

The method includes the following steps.

1. Preparing $Li_xNa_zCo_{1-y}M_yO_2$ with a $P6_{3mc}$ structure, where $0.6<x<0.85$, $0\leq y<0.15$, $0\leq z<0.03$, and M is at least one selected from Al, Mg, Ti, Mn, Fe, Ni, Zn, Cu, Nb, Cr, or Zr.

(1) Preparing an M-doped $Co_{3-y}M_yO_4$ precursor in a liquid-phase precipitation process and a sintering process: adding a soluble cobalt salt (such as cobalt chloride, cobalt acetate, cobalt sulfate, or cobalt nitrate) and an M salt (such as sulfate) at a molar ratio of Co: M=(3-y): y into a solvent (such as deionized water), adding a precipitant (such as sodium carbonate or sodium hydroxide) and a complexant (such as ammonia) at a concentration of 0.1 to 3 mol/L, where a molar ratio of the complexant to the precipitant is 0.1 to 1; adjusting the PH value (for example, to a value within a range of 5 to 9) to generate a precipitate; then sintering the precipitate at a temperature of 400° C. to 800° C. in the air for 5 to 20 hours, and grinding the sintered product to obtain $(Co_{3-y}M_y)_3O_4$ powder, where $0\leq y<0.15$.

(2) Synthesizing $Na_mCo_{1-y}M_yO_2$ in a solid-phase sintering process: mixing $(Co_{3-y}M_y)_3O_4$ powder and $Na_2CO_3$ powder at a molar ratio of Na:Co=0.7:1 (but not greater than 0.74:1); and sintering the evenly mixed powder at a temperature of 700° C. to 1000° C. in an oxygen atmosphere for 36 to 56 hours to obtain $Na_mCo_{1-y}M_yO_2$ with a $P6_{3mc}$ structure, where $0.6<m<1$.

(3) Synthesizing a $Li_xNa_zCo_{1-y}M_yO_2$ positive electrode material with a $P6_{3mc}$ structure in an ion exchange process: mixing $Na_mCo_{1-y}M_yO_2$ and a lithium-containing molten salt (such as lithium nitrate, lithium chloride, or lithium hydroxide) evenly at a molar ratio of Na:Li=0.01 to 0.2, reacting at a temperature of 200° C. to 400° C. in an air atmosphere for 2 to 8 hours, washing reactants several times with deionized water, and, after the molten salt is cleaned off, drying the powder to obtain the $Li_xNa_zCo_{1-y}M_yO_2$ positive electrode material with a $P6_{3mc}$ structure.

2. Preparing a Positive Electrode Plate

Stirring and mixing the $Li_xNa_zCo_{1-y}M_yO_2$ positive electrode material with a $P6_{3mc}$ structure, a conductive agent (such as acetylene black), and a binder (such as polyvinylidene difluoride (PVDF)) in a solvent (such as N-methyl-pyrrolidone) system thoroughly and evenly at a mass ratio (such as 97:2:1) to obtain a slurry, then coating a positive current collector (such as an aluminum foil) with the slurry, and performing drying and cold calendering to obtain a positive electrode plate.

3. Negative Electrode Plate

The negative electrode plate applicable to the electrochemical device, and the composition and the manufacturing method of the negative electrode plate include any technology disclosed in the prior art.

In some embodiments, the negative electrode plate includes a negative current collector and a negative active material layer located on at least one surface of the negative current collector.

In some embodiments, the negative active material layer includes a binder. In some embodiments, the binder includes, but is not limited to: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, or nylon.

In some embodiments, the negative active material layer includes a conductive material. In some embodiments, the conductive material includes, but is not limited to: natural graphite, artificial graphite, carbon black, acetylene black, Ketjen black, carbon fiber, metal powder, metal fiber, copper, nickel, aluminum, silver, or a polyphenylene derivative.

In some embodiments, the current collector includes, but is not limited to: a copper foil, a nickel foil, a stainless steel foil, a titanium foil, foamed nickel, foamed copper, or a polymer substrate coated with a conductive metal.

In some embodiments, the negative electrode plate may be obtained according to the following method: mixing an active material, a conductive material, and a binder in a solvent to prepare an active material composite, and coating the active material composite onto the current collector.

In some embodiments, the solvent may include, but is not limited to N-methyl-pyrrolidone.

4. Electrolytic Solution

The electrolytic solution applicable to the embodiments of this application may be an electrolytic solution known in the prior art.

In some embodiments, the electrolytic solution includes an organic solvent, a lithium salt, and an additive. The organic solvent of the electrolytic solution according to this application may be any organic solvent known in the prior art that can be used as a solvent of the electrolytic solution. An electrolyte used in the electrolytic solution according to this application is not limited, and may be any electrolyte known in the prior art. The additive of the electrolytic solution according to this application may be any additive known in the prior art that can be used as an additive of the electrolytic solution.

In some embodiments, the organic solvent includes, but is not limited to: ethylene carbonate (EC), propylene carbonate (PC), diethyl carbonate (DEC), ethyl methyl carbonate (EMC), dimethyl carbonate (DMC), propylene carbonate, or ethyl propionate.

In some embodiments, the lithium salt includes at least one of an organic lithium salt or an inorganic lithium salt.

In some embodiments, the lithium salt includes, but is not limited to: lithium hexafluorophosphate ($LiPF_6$), lithium tetrafluoroborate ($LiBF_4$), lithium difluorophosphate ($LiPO_2F_2$), lithium bistrifluoromethanesulfonimide LiN $(CF_3SO_2)_2$ (LiTFSI), lithium bis(fluorosulfonyl)imide Li(N $(SO_2F)_2$) (LiFSI), lithium bis(oxalate) borate $LiB(C_2O_4)_2$ (LiBOB), or lithium difluoro(oxalate)borate $LiBF_2(C_2O_4)$ (LiDFOB).

In some embodiments, a concentration of the lithium salt in the electrolytic solution is approximately 0.5 mol/L to 3 mol/L, approximately 0.5 mol/L to 2 mol/L, or approximately 0.8 mol/L to 1.5 mol/L.

5. Separator

In some embodiments, a separator is disposed between the positive electrode plate and the negative electrode plate to prevent a short circuit. The material and the shape of the separator applicable to the embodiments of this application are not particularly limited, and may be based on any technology disclosed in the prior art. In some embodiments, the separator includes a polymer or an inorganic compound or the like formed from a material that is stable to the electrolytic solution according to this application.

For example, the separator may include a substrate layer and a surface treatment layer. The substrate layer is a non-woven fabric, film or composite film, which, in each case, have a porous structure. The material of the substrate layer is selected from at least one of polyethylene, polypropylene, polyethylene terephthalate, and polyimide. Specifically, the material of the substrate layer may be a polypropylene porous film, a polyethylene porous film, a polypropylene non-woven fabric, a polyethylene non-woven fabric, or a polypropylene-polyethylene-polypropylene porous composite film.

A surface treatment layer is disposed on at least one surface of the substrate layer. The surface treatment layer may be a polymer layer or an inorganic compound layer, or a layer formed by mixing a polymer and an inorganic compound.

The inorganic compound layer includes inorganic particles and a binder. The inorganic particles are selected from a combination of one or more of an aluminum oxide, a silicon oxide, a magnesium oxide, a titanium oxide, a hafnium dioxide, a tin oxide, a ceria, a nickel oxide, a zinc oxide, a calcium oxide, a zirconium oxide, an yttrium oxide, a silicon carbide, a boehmite, an aluminum hydroxide, a magnesium hydroxide, a calcium hydroxide, and a barium sulfate. The binder is at least one selected from a polyvinylidene fluoride, a vinylidene fluoride-hexafluoropropylene copolymer, a polyamide, a polyacrylonitrile, a polyacrylate, a polyacrylic acid, a polyacrylate, a polyvinylpyrrolidone, a polyvinyl ether, a poly methyl methacrylate, a polytetrafluoroethylene, or a polyhexafluoropropylene.

The polymer layer includes a polymer, and the material of the polymer is at least one selected from a polyamide, a polyacrylonitrile, an acrylate polymer, a polyacrylic acid, a polyacrylate, a polyvinylpyrrolidone, a polyvinyl ether, a polyvinylidene fluoride, or a poly(vinylidene fluoride-hexafluoropropylene).

The following describes preparation of a lithium-ion battery as an example with reference to specific embodiments. A person skilled in the art understands that the preparation method described in this application are merely examples. Any other appropriate preparation methods fall within the scope of this application.

Embodiments

The following describes a method for preparing a lithium-ion battery and a performance test method according to embodiments and comparative embodiments of this application.

Embodiment 1

Preparing $Li_{0.73}Na_{0.02}CoO_2$ with a $P6_{3mc}$ Structure

Step (1): Mixing tricobalt tetraoxide and sodium carbonate powder at a molar ratio of Na:Co=0.75:1; sintering the evenly mixed powder at a temperature of 800° C. in an oxygen atmosphere for 46 hours to obtain $Na_{0.75}CoO_2$ with a $P6_{3mc}$ structure.

Step (2): Mixing $Na_{0.75}CoO_2$ and lithium nitrate evenly at a molar ratio of Na:Li=0.75:5, reacting at a temperature of 300° C. in an air atmosphere for 6 hours, washing the reactants several times with deionized water, and, after the melted salt is cleaned off, drying the powder to obtain $Li_{0.73}Na_{0.02}CoO_2$ with a $P6_{3mc}$ structure.

Embodiment 2

Preparing $Li_{0.63}Co_{0.985}Al_{0.015}O_2$ with a $P6_{3mc}$ Structure

Step (1): Preparing an Al-doped $(Co_{0.985}Mo_{0.015})_3O_4$ precursor in a liquid-phase precipitation process and a sintering process: adding cobalt chloride and aluminum sulfate at a molar ratio of Co:Al=0.985:0.015 into deionized water, adding sodium carbonate as a precipitant and ammonia as a complexant, adjusting the PH value to 7 to generate a precipitate, then sintering the precipitate at a temperature of 600° C. for 7 hours, and grinding the sintered product to obtain $(Co_{0.985}M_{0.015})_3O_4$ powder.

Step (2): Mixing the $(Co_{0.985}Al_{0.015})_3O_4$ powder and sodium carbonate powder at a molar ratio of Na:Co=0.63:0.985; sintering the evenly mixed powder at a temperature of 800° C. in an oxygen atmosphere for 46 hours to obtain $Na_{0.63}Co_{0.985}Al_{0.015}O_4$.

Step (3): Mixing the $Na_{0.63}Co_{0.985}Al_{0.015}O_4$ powder and lithium nitrate evenly at a molar ratio of Na:Li=0.63:5, reacting at a temperature of 300° C. in an air atmosphere for 6 hours, washing the reactants several times with deionized water, and, after the melted salt is cleaned off, drying the powder to obtain $Li_{0.63}Co_{0.985}Al_{0.015}O_2$ with a $P6_{3mc}$ structure.

Embodiment 3

Preparing $Li_{0.63}Na_{0.01}Co_{0.985}Al_{0.015}O_2$ with a $P6_{3mc}$ Structure Step (1): Adding cobalt chloride and aluminum sulfate at a molar ratio of Co:Al=0.985:0.015 into deionized water, adding sodium carbonate as a precipitant and ammonia as a complexant, adjusting the PH value to 7 to generate a precipitate, then sintering the precipitate at a temperature of 600° C. for 7 hours, and grinding the sintered product to obtain $(Co_{0.985}Al_{0.015})_3O_4$ powder.

Step (2): Mixing the $(Co_{0.985}Al_{0.015})_3O_4$ powder and sodium carbonate powder at a molar ratio of Na:Co=0.64:0.985; sintering the evenly mixed powder at a temperature of 800° C. in an oxygen atmosphere for 46 hours to obtain $Na_{0.64}Co_{0.985}Al_{0.015}O_2$.

Step (3): Mixing the $Na_{0.64}Co_{0.985}Al_{0.015}O_2$ and lithium nitrate evenly at a molar ratio of Na:Li=0.64:5, reacting at a temperature of 300° C. in an air atmosphere for 6 hours, washing the reactants several times with deionized water, and, after the melted salt is cleaned off, drying the powder to obtain $Li_{0.63}Na_{0.01}Co_{0.985}Al_{0.015}O_2$ with a $P6_{3mc}$ structure.

Embodiments 4 to 16

The preparation method in Embodiments 4 to 16 is basically the same as that in Embodiment 3, but differs in the type and/or content of the dopant element.

Table 1 below sets out detailed chemical formulas used in Embodiments 1~16.

TABLE 1

| Embodiment | Chemical formula |
| --- | --- |
| 1 | $Li_{0.73}Na_{0.02}CoO_2$ |
| 2 | $Li_{0.63}Co_{0.985}Al_{0.015}O_2$ |
| 3 | $Li_{0.63}Na_{0.01}Co_{0.985}Al_{0.015}O_2$ |
| 4 | $Li_{0.69}Na_{0.01}Co_{0.985}Al_{0.015}O_2$ |
| 5 | $Li_{0.72}Na_{0.01}Co_{0.985}Al_{0.015}O_2$ |
| 6 | $Li_{0.73}Na_{0.01}Co_{0.985}Al_{0.015}O_2$ |
| 7 | $Li_{0.74}Na_{0.008}Co_{0.98}Al_{0.02}O_2$ |

TABLE 1-continued

| Embodiment | Chemical formula |
|---|---|
| 8 | $Li_{0.74}Na_{0.006}Co_{0.975}Al_{0.025}O_2$ |
| 9 | $Li_{0.74}Na_{0.006}Co_{0.991}Mg_{0.009}O_2$ |
| 10 | $Li_{0.74}Na_{0.01}Co_{0.986}Mg_{0.014}O_2$ |
| 11 | $Li_{0.74}Na_{0.006}Co_{0.983}Al_{0.015}Mg_{0.002}O_2$ |
| 12 | $Li_{0.74}Na_{0.005}Co_{0.981}Al_{0.018}Mg_{0.001}O_2$ |
| 13 | $Li_{0.74}Na_{0.004}Co_{0.984}Al_{0.015}Ti_{0.001}O_2$ |
| 14 | $Li_{0.74}Na_{0.004}Co_{0.992}Al_{0.007}Ti_{0.001}O_2$ |
| 15 | $Li_{0.74}Na_{0.003}Co_{0.995}Al_{0.003}Mg_{0.001}Ti_{0.001}O_2$ |
| 16 | $Li_{0.74}Na_{0.003}Co_{0.994}Al_{0.003}Mg_{0.002}Ti_{0.001}O_2$ |

Embodiment 17

Preparing $Li_{0.73}Na_{0.01}Co_{0.985}Al_{0.015}O_2$ with a $P6_{3mc}$ Structure The steps in Embodiment 17 are basically the same as those in Embodiment 6, but merely differ in that Embodiment 17 controls the sintering temperature and the ingredient mixing method in step 1 to obtain $Li_{0.73}Na_{0.01}Co_{0.985}Al_{0.015}O_2$ that possesses a $P6_{3mc}$ structure and a different average particle diameter (D50) and a different tapped density.

Embodiment 18

Preparing $Li_{0.73}Na_{0.01}Co_{0.985}Al_{0.015}O_2$ with a $P6_{3mc}$ structure The steps in Embodiment 18 are basically the same as those in Embodiment 6, but merely differ in that Embodiment 18 controls the sintering temperature and the ingredient mixing method in step 1 to obtain $Li_{0.73}Na_{0.01}Co_{0.985}Al_{0.015}O_2$ that possesses a $P6_{3mc}$ structure and a different average particle diameter (D50) and a different tapped density, without pores on the surface of particles.

Embodiment 19

Preparing $Li_{0.73}Na_{0.01}Co_{0.985}Al_{0.015}O_2$ with a $P6_{3mc}$ structure The steps in Embodiment 19 are basically the same as those in Embodiment 6, but merely differ in that Embodiment 19 controls the sintering temperature and the ingredient mixing method in step 1 to obtain $Li_{0.73}Na_{0.01}Co_{0.985}Al_{0.015}O_2$ that possesses a $P6_{3mc}$ structure and a different average particle diameter (D50) and a different tapped density, without gaps inside the particles.

Embodiment 20

Preparing $Li_{0.73}Na_{0.01}Co_{0.985}Al_{0.015}O_2$ with a $P6_{3mc}$ Structure The steps in Embodiment 20 are basically the same as those in Embodiment 6, but merely differ in that Embodiment 20 controls the sintering temperature and the ingredient mixing method in step 1 to obtain $Li_{0.73}Na_{0.01}Co_{0.985}Al_{0.015}O_2$ that possesses a $P6_{3mc}$ structure and a different average particle diameter (D50) and a different tapped density.

Table 2 below shows details of D50, tapped density, pores on the surface of the particles, and gaps inside the particles of the positive electrode material in Embodiment 6 and Embodiments 17 to 20.

TABLE 2

| Serial number | D50 (μm) | Tapped density (g/cm³) | Pores | Gaps |
|---|---|---|---|---|
| Embodiment 6 | 12 | 2.7 | Yes | Yes |
| Embodiment 17 | 9 | 2.2 | Yes | Yes |
| Embodiment 18 | 12 | 2.7 | No | Yes |
| Embodiment 19 | 12 | 2.7 | Yes | No |
| Embodiment 20 | 12 | 2.2 | Yes | Yes |

Comparative Embodiment 1

Preparing $Li_{0.58}Na_{0.01}Co_{0.985}Al_{0.015}O_2$ with a Non-$P6_{3mc}$ Structure Step (1): Adding cobalt chloride and aluminum sulfate at a molar ratio of Co:Al=0.985:0.015 into deionized water, adding sodium carbonate as a precipitant and ammonia as a complexant, adjusting the PH value to 7 to generate a precipitate, then sintering the precipitate, and grinding the sintered product to obtain $(Co_{0.985}Al_{0.015})_3O_4$ powder.

Step (2): Mixing the $(Co_{0.985}Al_{0.015})_3O_4$ powder and lithium carbonate evenly at a molar ratio of Li:Co=0.58:0.985, and then sintering the mixture at a temperature of 1000° C. in the air for 12 hours, and, after the sintered product is cooled, grinding and sieving the sintered product to obtain $Li_{0.58}Na_{0.01}Co_{0.985}Al_{0.015}O_2$ with an R-3m structure.

Comparative Embodiment 2

Preparing $Li_{0.8}Na_{0.006}Co_{0.983}Al_{0.015}Mg_{0.002}O_2$ with a Non-$P6_{3mc}$ Structure Step (1): Adding cobalt chloride, aluminum sulfate, and magnesium sulfate at a molar ratio of Co:Al:Mg=0.983:0.015:0.002 into deionized water, adding sodium carbonate as a precipitant and ammonia as a complexant, adjusting the PH value to 7 to generate a precipitate, then sintering the precipitate, and grinding the sintered product to obtain $(Co_{0.983}Al_{0.015}Mg_{0.002})_3O_4$ powder.

Step (2): Mixing the $(Co_{0.983}Al_{0.015}Mg_{0.002})_3O_4$ powder and lithium carbonate evenly at a molar ratio of Li:Co=0.8:0.983, and then sintering the mixture at a temperature of 1000° C. in the air for 12 hours, and, after the sintered product is cooled, grinding and sieving the sintered product to obtain $Li_{0.8}Na_{0.006}Co_{0.983}Al_{0.015}Mg_{0.002}O_2$ with an R-3m structure.

Comparative Embodiment 3

Preparing $Li_{0.55}Na_{0.004}Co_{0.984}Al_{0.015}Ti_{0.001}O_2$ with a non-$P6_{3mc}$ Structure Step (1): Adding cobalt chloride, aluminum sulfate, and titanium nitrate at a molar ratio of Co:Al:Ti=0.984:0.015:0.001 into deionized water, adding sodium carbonate as a precipitant and ammonia as a complexant, adjusting the PH value to 7 to generate a precipitate, then sintering the precipitate, and grinding the sintered product to obtain $(Co_{0.984}Al_{0.015}Ti_{0.001})_3O_4$ powder.

Step (2): Mixing the $(Co_{0.984}Al_{0.015}Ti_{0.001})_3O_4$ powder and lithium carbonate evenly at a molar ratio of Li:Co=0.55:0.984, and then sintering the mixture at a temperature of 1000° C. in the air for 12 hours, and, after the sintered product is cooled, grinding and sieving the sintered product to obtain $Li_{0.55}Na_{0.004}Co_{0.984}Al_{0.015}Ti_{0.001}O_2$ with an R-3m structure.

Comparative Embodiment 4

Preparing $Li_{0.57}Na_{0.003}Co_{0.994}Al_{0.003}Mg_{0.002}Ti_{0.001}O_2$ with a non-$P6_{3mc}$ Structure Step (1): Adding cobalt chloride, aluminum sulfate, magnesium sulfate, and titanium nitrate at a molar ratio of Co:Al:Mg:Ti=0.994:0.003:0.002:0.001 into deionized water, adding sodium carbonate as a precipitant and ammonia as a complexant, adjusting the PH value to 7 to generate a precipitate, then sintering the precipitate, and grinding the sintered product to obtain $(Co_{0.994}Al_{0.003}Mg_{0.002}Ti_{0.001})_3O_4$ powder.

Step (2): Mixing the $(Co_{0.994}Al_{0.003}Mg_{0.002}Ti_{0.001})_3O_4$ powder and lithium carbonate evenly at a molar ratio of Li:Co=0.57:0.994, and then sintering the mixture at a temperature of 1000° C. in the air for 12 hours, and, after the sintered product is cooled, grinding and sieving the sintered product to obtain $Li_{0.57}Na_{0.003}Co_{0.994}Al_{0.003}Mg_{0.002}Ti_{0.001}O_2$ with an R-3m structure.

Performance Test Method

To test the electrochemical performance of the positive electrode plate, a lithium-ion battery is prepared according to the following steps, and the corresponding electrochemical performance of each lithium-ion battery is tested.

Positive electrode plate: Stirring and mixing the positive electrode material prepared in the foregoing embodiments and comparative embodiments, acetylene black as a conductive agent, and polyvinylidene difluoride (PVDF) as a binder in an N-methyl-pyrrolidone solvent system thoroughly and evenly at a mass ratio of 97:2:1 to obtain a slurry, then coating an aluminum foil as a positive current collector with the slurry, and performing drying and cold calendering to obtain a positive electrode plate that contains a single-layered positive active layer (hereinafter referred to as "single-layered positive electrode plate").

Negative electrode plate: Stirring and mixing artificial graphite, acetylene black as a conductive agent, styrene butadiene rubber (SBR) as a binder, sodium carboxymethyl cellulose (CMC) as a thickener in a deionized water solvent system thoroughly and evenly at a mass ratio of approximately 95:2:2:1 to obtain a slurry, then coating a copper foil with the slurry, and performing drying and cold calendering to obtain a negative electrode plate.

Separator: Using a PE porous polymer film as a separator.

Electrolytic solution: In an argon atmosphere glovebox in which the water content is less than 10 ppm, mixing ethylene carbonate (EC for short), diethyl carbonate (DEC for short), and propylene carbonate (PC for short) evenly at a mass ratio of 2:6:2, dissolving thoroughly dried lithium salt LiPF6 in the foregoing solvent in which the content of $LiPF_6$ is 1 mol/L, and adding 1.5 wt % 1,3-propane sultone, 3 wt % fluoroethylene carbonate, and 2 wt % adiponitrile. The content of each ingredient is a percentage of the ingredient in the total mass of the electrolytic solution.

Stacking the positive electrode plate, the separator, and the negative electrode plate sequentially, letting the separator be located between the positive electrode plate and the negative electrode plate to serve a function of separation, winding the electrode plates, and welding tabs to obtain a bare cell. Putting the bare cell into an outer package, injecting the prepared electrolytic solution, and performing packaging; and performing steps such as chemical formation, degassing, and edge trimming to obtain a battery.

SEM Test

The scanning electron microscopy (SEM) is a process of performing interaction between an electron beam and a sample to obtain a morphology of the sample by using secondary electron signal imaging. The scanning electron microscope used in this embodiment is a JSM-6360LV model manufactured by JEOL and a corollary X-ray energy dispersive spectrometer, and is used to analyze the morphology and element distribution of the sample.

DSC Test

Putting 0.2 gram of the positive electrode material into a DSC test device (TOPEM TMDSC) in an air atmosphere to perform a DSC test, and heating the positive electrode material at a heating speed of 10° C./min until 800° C. to obtain a temperature-heat release curve.

Cyclic Voltammetry Test Method

Scanning a battery at a scanning speed of 0.1 mV/s by using a Gamry electrochemical workstation when the voltage of the battery is 3 V to 4.8 V, and obtain a CV curve after scanning for one cycle.

Capacity Attenuation Rate/Retention Rate Test Method

Charging and discharging the battery for a first time in a 25° C. environment, charging the battery at a constant current of 0.5C (a current at which the theoretic capacity of the battery will be fully discharged within 2 hours) until the voltage reaches an upper limit of 4.8 V; then, discharging the battery at a constant current of 0.5C until the voltage reaches a final voltage of 3 V, and recording the discharge capacity at the end of the first cycle; repeating the charge and discharge steps until the $N^{th}$ cycle (N may be determined according to actual needs), and recording discharge capacity at the end of the $N^{th}$ cycle. Calculating the $N^{th}$-cycle capacity attenuation rate and capacity retention rate of the lithium-ion battery according to the following formula:

$N^{th}$-cycle capacity attenuation rate=(first-cycle discharge capacity/$20^{th}$-cycle discharge capacity)/first-cycle discharge capacity×100%.

$N^{th}$-cycle capacity retention rate=$20^{th}$-cycle discharge capacity/first-cycle discharge capacity×100%.

Compacted Density Test Method

Discharging the battery to a 0% SOC (SOC: state of charge, state of charge), disassembling the battery, washing and drying the battery, weighing a piece (covering an area of A) of the positive electrode plate with an electronic balance to obtain a weight $W_1$ (both sides of the positive current collector are coated with the positive active material layer), and measuring the thickness $T_1$ of the positive electrode with a micrometer. Washing off the positive active material layer by using a solvent, drying the positive current collector, weighing the positive current collector to obtain a weight $W_2$, and measuring the thickness $T_2$ of the positive current collector with a micrometer. Calculating the weight $W_0$, the thickness $T_0$, and the compacted density of the positive active material layer disposed on one side of the positive current collector according to the following formula:

$W0 = (W1 - W2)/2$ $T0 = (T1 - T2)/2$

Compacted density = $W0/(T0 \times A)$

Table 3 below shows the peak positions and the full width at half maximum of the (002) and/or (003) crystal planes of the materials in Embodiments 1~16 and Comparative Embodiments 1~4.

TABLE 3

| Serial number | Peak position of crystal plane | Full width at half maximum |
|---|---|---|
| Embodiment 1 | 17.7 | 0.06 |
| Embodiment 2 | 18 | 0.065 |
| Embodiment 3 | 17.5 | 0.06 |
| Embodiment 4 | 17.55 | 0.065 |
| Embodiment 5 | 17.58 | 0.068 |
| Embodiment 6 | 17.59 | 0.069 |
| Embodiment 7 | 17.6 | 0.07 |
| Embodiment 8 | 17.6 | 0.07 |
| Embodiment 9 | 17.6 | 0.07 |
| Embodiment 10 | 17.6 | 0.07 |
| Embodiment 11 | 17.6 | 0.07 |
| Embodiment 12 | 17.6 | 0.07 |
| Embodiment 13 | 17.6 | 0.07 |
| Embodiment 14 | 17.6 | 0.07 |
| Embodiment 15 | 17.6 | 0.07 |
| Embodiment 16 | 17.6 | 0.07 |
| Comparative Embodiment 1 | 16.8 | 0.12 |
| Comparative Embodiment 2 | 19.2 | 0.11 |
| Comparative Embodiment 3 | 16.5 | 0.11 |
| Comparative Embodiment 4 | 16.2 | 0.11 |

Analysis of Table 3 shows that the (002) crystal plane of $Li_xNa_zCo_{1-y}M_yO_2$ with a $P6_{3mc}$ structure in Embodiments 1 to 16 of this application is located between 17.5° and 19°, and the full width at half maximum thereof falls between 0.05 and 0.1. However, in the $Li_xNa_zCo_{1-y}M_yO_2$ with a non-$P6_{3mc}$ structure in Comparative Embodiments 1 to 4, no (002) peak exists between 17.5° and 19°. In Comparative Embodiments 1 to 4, a (003) peak exists at 16.8°, 19.2°, 16.5° and 16.2°.

Table 4 below shows the values of x, y, and z of the positive electrode material of the lithium-ion battery containing the positive electrode material according to Embodiments 1 to 16 and Comparative Embodiments 1 to 4 after charge and discharge cycles; the first-cycle discharge capacity of the lithium-ion battery, the $100^{th}$-cycle capacity retention rate (for which the test method and test conditions are the same as those described in the section "Capacity attenuation rate/retention rate test method"), the reduction peak position in the voltammetry curve (for which the test method and test conditions are the same as those described in the section "Cyclic voltammetry test method"), and the delithiation percentage of the battery charged until a voltage of 4.7 V; the compacted density of the positive active layer; and the peak position difference and peak intensity ratio between two peaks of the positive electrode material in an XRD pattern within a range of 17° to 19° when the battery is in a fully discharged state after the $20^{th}$ cycle.

TABLE 4

| Serial number | x | y | z | First-cycle discharge capacity (mAh/g) | Capacity retention rate | Compacted density | Peak position difference between two peaks (°) | Peak intensity ratio | Reduction peak position | Delithiation percentage |
|---|---|---|---|---|---|---|---|---|---|---|
| Embodiment 1 | 0.63 | 0 | 0.02 | 237 | 89% | 4.3 | 0.6 | 0.2 | 4.51 | 96.00% |
| Embodiment 2 | 0.67 | 0.015 | 0 | 239 | 90% | 4.25 | 0.61 | 0.43 | 4.52 | 96.50% |
| Embodiment 3 | 0.73 | 0.015 | 0.01 | 239 | 91% | 4.24 | 0.62 | 0.52 | 4.512 | 96.10% |
| Embodiment 4 | 0.75 | 0.015 | 0.01 | 239.5 | 90.50% | 4.22 | 0.62 | 0.6 | 4.52 | 96.30% |
| Embodiment 5 | 0.79 | 0.015 | 0.01 | 240 | 90% | 4.21 | 0.64 | 0.61 | 4.54 | 96.50% |
| Embodiment 6 | 0.83 | 0.015 | 0.01 | 242 | 89.90% | 4.2 | 0.67 | 0.58 | 4.53 | 96.10% |
| Embodiment 7 | 0.87 | 0.02 | 0.008 | 245 | 90% | 4.2 | 0.66 | 0.64 | 4.515 | 96.00% |
| Embodiment 8 | 0.87 | 0.025 | 0.006 | 249 | 88% | 4.19 | 0.65 | 0.68 | 4.532 | 97.00% |
| Embodiment 9 | 0.63 | 0.009 | 0.006 | 241 | 91% | 4.27 | 0.73 | 0.57 | 4.525 | 97.20% |
| Embodiment 10 | 0.67 | 0.014 | 0.01 | 239 | 90.90% | 4.24 | 0.75 | 0.63 | 4.514 | 97.31% |
| Embodiment 11 | 0.73 | 0.015 + 0.002 | 0.006 | 243 | 89% | 4.22 | 0.66 | 0.61 | 4.55 | 97.20% |
| Embodiment 12 | 0.75 | 0.018 + 0.001 | 0.005 | 243 | 88% | 4.2 | 0.74 | 0.59 | 4.54 | 97.11% |
| Embodiment 13 | 0.79 | 0.015 + 0.001 | 0.004 | 248 | 90.50% | 4.18 | 0.71 | 0.8 | 4.53 | 97.20% |
| Embodiment 14 | 0.83 | 0.007 + 0.001 | 0.004 | 249 | 91% | 4.17 | 0.78 | 0.82 | 4.55 | 97.11% |
| Embodiment 15 | 0.87 | 0.003 + 0.001 + 0.001 | 0.003 | 241 | 90.90% | 4.15 | 0.76 | 0.4 | 4.57 | 97.20% |
| Embodiment 16 | 0.87 | 0.003 + 0.002 + 0.001 | 0.003 | 241 | 89% | 4.12 | 0.81 | 0.55 | 4.55 | 98.20% |
| Comparative Embodiment 1 | 0.58 | 0.015 | 0.01 | 245 | 50% | 4.38 | No double peak | No double peak | None | 80.20% |
| Comparative Embodiment 2 | 0.92 | 0.015 + 0.002 | 0.006 | 243 | 48% | 4.04 | No double peak | No double peak | None | 92.30% |
| Comparative Embodiment 3 | 0.95 | 0.015 + 0.001 | 0.004 | 242 | 38% | 4.02 | No double peak | No double peak | None | 94.50% |

TABLE 4-continued

| Serial number | x | y | z | First-cycle discharge capacity (mAh/g) | Capacity retention rate | Compacted density | Peak position difference between two peaks (°) | Peak intensity ratio | Reduction peak position | Delithiation percentage |
|---|---|---|---|---|---|---|---|---|---|---|
| Comparative Embodiment 4 | 0.95 | 0.003 + 0.002 + 0.001 | 0.003 | 245 | 47% | 4.01 | No double peak | No double peak | None | 91.20% |

Figure 2:
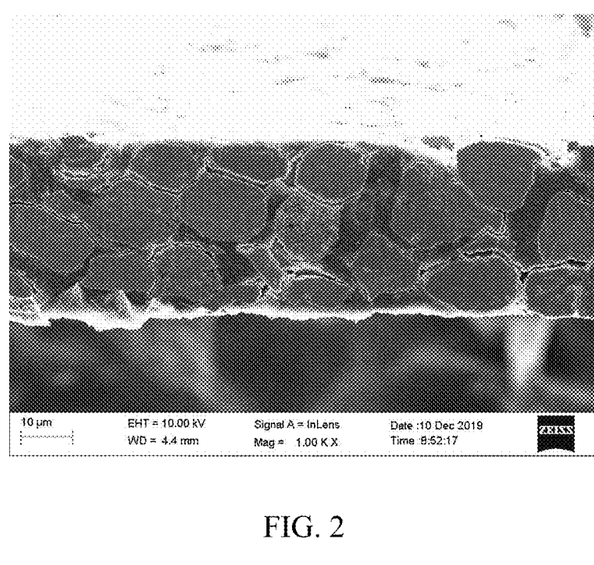
FIG. 2 is a cross-section polishing scanning electron microscope (CP-SEM) image of a positive electrode plate according to Embodiment 1 of this application.

Analysis of Table 4 shows that when the electrochemical device adopts a lithium-rich negative electrode, the lithium content in the positive electrode plate is substantially in an upward trend after electrochemical lithiation, where $0.6<x<1$; the compacted density of the positive active material layer is 4.2 g/cm$^3$ to 4.35 g/cm$^3$. Further, as shown in FIG. 2, the compacted density of the positive electrode plate made of the material according to this embodiment of this application is good.

Figure 1:
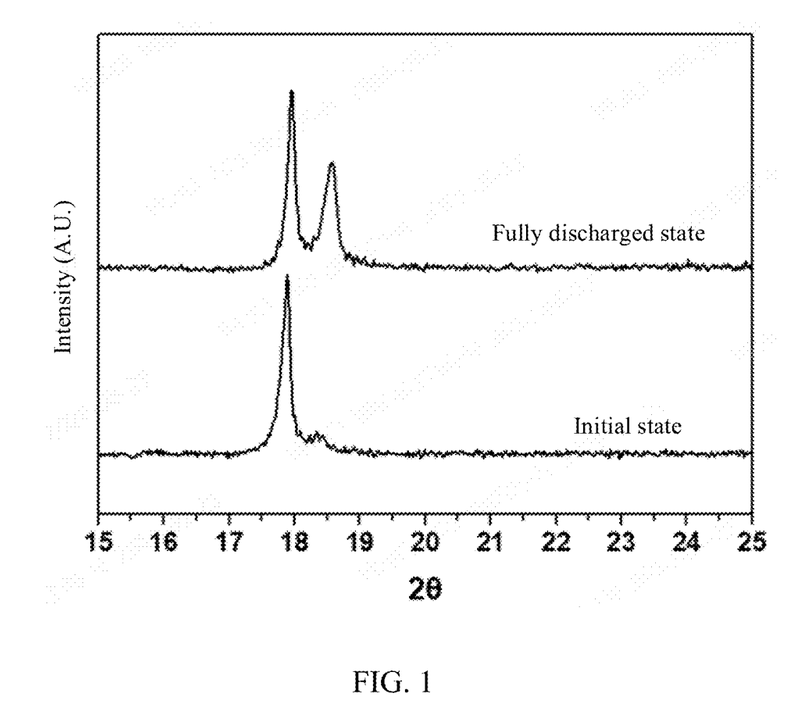
FIG. 1 is an X-ray diffraction (XRD) pattern of a positive electrode material in an initial state and an XRD pattern in a fully discharged state after a $20^{th}$ cycle according to Embodiment 1 of this application.

Referring to FIG. 1 and the XRD data in Table 3 and Table 4, in an XRD pattern of Embodiments 1 to 16 when the battery is in a fully discharged state, the single peak changes to a double peak in a range of 17° to 19°, a peak position difference between the two peaks is 0.5° to 1°, and a peak intensity ratio of a low-angle peak to a high-angle peak is 0 to 1. The double peak indicates that the material according to this embodiment of this application can not only fully return to the initial phase during lithiation, but also accommodate additional lithium ions and form a stable new phase. The coexistence of the two phases increases the discharge capacity of the material significantly. The materials in Comparative Embodiments 1 to 4 merely change the peak position of a single peak without bringing the foregoing effects.

Figure 5:
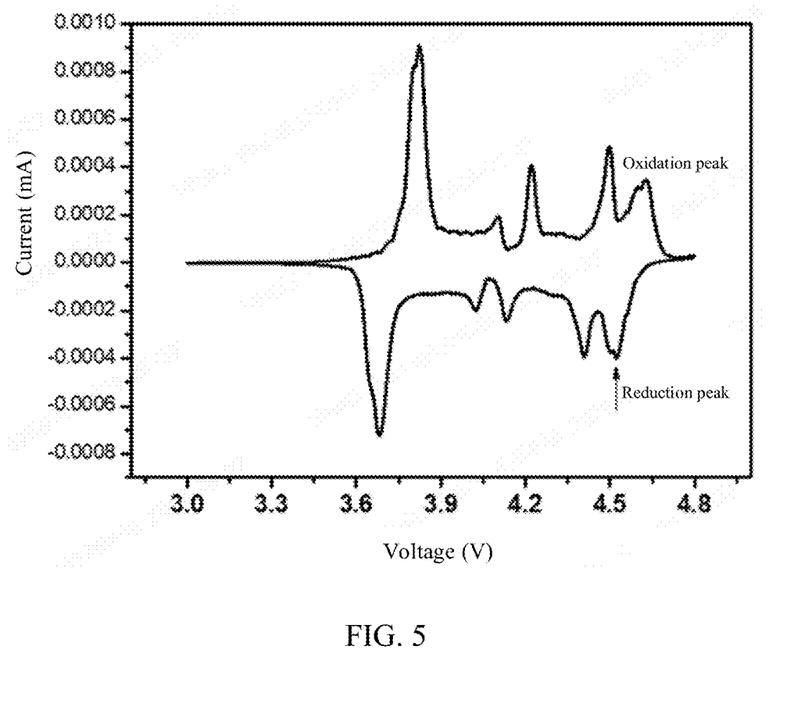
FIG. 5 is a cyclic voltammetry curve of a lithium-ion battery according to Embodiment 1 of this application.

A system formed by an oxidation reaction and a reduction reaction of the positive electrode material is called a redox couple. The redox couple corresponds to an oxidation peak and a reduction peak in a cyclic voltammetry (CV) curve respectively. A peak above the CV curve is referred to as an oxidation peak, and a peak below the CV curve is referred to as a reduction peak. The oxidation peak corresponds to a material delithiation process, and the reduction peak corresponds to a material lithiation process. Refer to the CV curve in FIG. 5. As can be learned from the cyclic voltammetry curve in FIG. 5 and the reduction peak position in Table 4, in the high-voltage range (4.5 V) in Comparative Embodiments 1 to 4, there is merely an oxidation peak (in a delithiation process) but no corresponding reduction peak (in a lithiation process), indicating poor structural reversibility. However, redox peaks exist in pairs near 4.5 V in Embodiments 1 to 16, indicating excellent structural reversibility. Therefore, the cycle stability is high.

Analysis of the electrochemical data in Table 4 shows that the first-cycle discharge capacity and the 100$^{th}$-cycle capacity retention rate of the lithium-ion battery containing $Li_xNa_zCo_{1-y}M_yO_2$ with a $P6_{3mc}$ structure in Embodiments 1 to 16 of this application are significantly better than the corresponding electrochemical performance of the lithium-ion battery containing $Li_xNa_zCo_{1-y}M_yO_2$ with a non-$P6_{3mc}$ structure in Comparative Embodiments 1 to 4.

Figure 4:
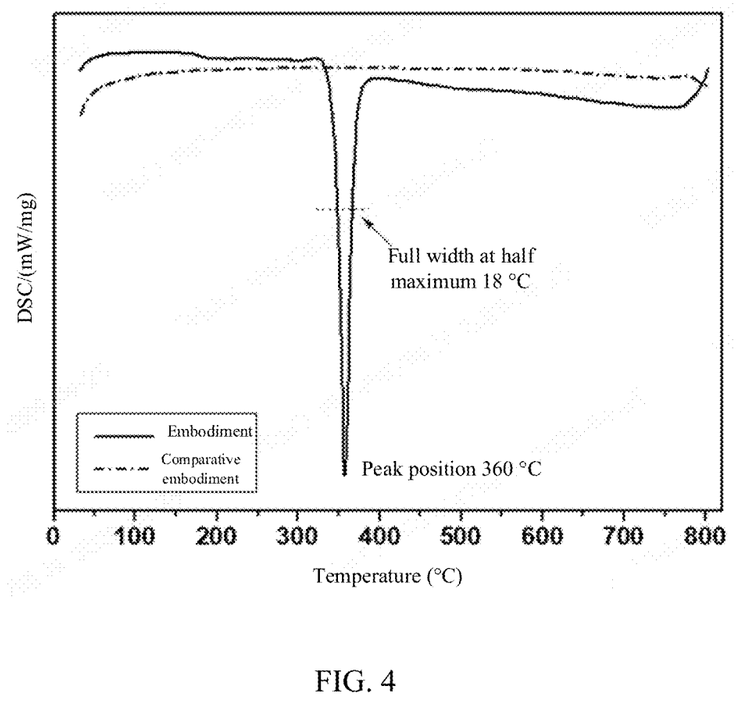
FIG. 4 is a differential scanning calorimetry (DSC) curve of a positive electrode material according to Embodiment 1 and Comparative Embodiment 1 of this application.

FIG. 4 is a differential scanning calorimetry (DSC: Differential Scanning calorimetry) pattern of $Li_{0.73}Na_{0.02}CoO_2$ with a $P6_{3mc}$ structure of the positive electrode material in Embodiment 6 of this application and $Li_{0.58}Na_{0.01}Co_{0.985}Al_{0.015}O_2$ with a non-$P6_{3mc}$ structure in Comparative Embodiment 1. As can be seen from the pattern, the positive electrode material in Embodiment 6 possesses an exothermic peak at 360° C., and the full width at half maximum of the exothermic peak falls on 18° C., but the positive electrode material in Comparative Embodiment 1 possesses no exothermic peak within the foregoing range. After research in the present invention, it is found that the positive electrode material according to this embodiment of this application possesses an exothermic peak between 250° C. and 400° C., and the full width at half maximum of the exothermic peak falls between 15° C. and 40° C.

Table 5 below shows parameters such as the morphology and tapped density of the material according to Embodiment 6 and Embodiments 17 to 20. As can be seen from the table, the performance of the materials with different D50 values, tapped densities, and pores and gaps in such embodiments is higher than the corresponding performance of the materials in the comparative embodiments. The performance of the material in Embodiment 6 is better, in which the D50 is 10 μm to 30 μm, the tapped density is 2.5 g/cm$^3$ to 3 g/cm$^3$, and pores and gaps exist.

When a given quantity of gaps exist in the positive electrode material, the electrolytic solution infiltrates more thoroughly, and the lithium ions are transmitted more quickly. Therefore, the electrochemical performance of the material disclosed in Embodiment 6 is better.

TABLE 5

| Serial number | D50 | Tapped density (g/cm$^3$) | Pores | Gaps | Quantity of gaps | First-cycle discharge capacity (4.8 V) | Capacity retention rate (100$^{th}$ cycle) |
|---|---|---|---|---|---|---|---|
| Embodiment 6 | 12 | 2.7 | Yes | Yes | 10 | 245 | 90% |
| Embodiment 17 | 9 | 2.2 | Yes | Yes | 5 | 239 | 89% |
| Embodiment 18 | 12 | 2.7 | No | Yes | 2 | 241 | 85% |
| Embodiment 19 | 12 | 2.7 | Yes | No | 0 | 241.5 | 84.9% |
| Embodiment 20 | 12 | 2.2 | Yes | Yes | 2 | 238 | 83.2% |

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment or example in this application. In addition, specific features, structures, materials, or characteristics herein may be combined in one or more embodiments or examples in any appropriate manner.

Although illustrative embodiments have been demonstrated and described above, a person skilled in the art understands that the above embodiments are not to be construed as a limitation on this application, and changes, replacements, and modifications may be made to the embodiments without departing from the spirit, principles, and scope of this application.

What is claimed is:

1. A positive electrode material, comprising: $Li_xNa_zCo_{1-y}MO_2$ with an O2 structure, wherein $0.6<x<0.85$, $0<y<0.15$, $0<z<0.03$, and M is Al and optionally at least one selected from the group consisting of Mg, Ti, Mn, Fe, Ni, Zn, Cu, Nb, Cr, and Zr;

wherein in a differential scanning calorimetry pattern of the positive electrode material, an exothermic peak exists between 330° C. and 360° C., and a full width at half maximum of the exothermic peak falls between 15° C. and 40° C.

2. The positive electrode material according to claim 1, wherein in an X-ray diffraction analysis (XRD) pattern of the positive electrode material, a (002) crystal plane is located between 17.5° and 19°, and a full width at half maximum thereof falls between 0.05 and 0.1.

3. The positive electrode material according to claim 1, wherein an average particle diameter of the positive electrode material is 8 μm to 30 μm, and a tapped density of the positive electrode material is 2.2 g/cm³ to 3 g/cm³.

4. The positive electrode material according to claim 1, wherein the positive electrode material satisfies at least one of the following characteristics:

particles of the positive electrode material are porous; or
gaps exist in the particles of the positive electrode material.

5. An electrochemical device, comprising a positive electrode plate, wherein the positive electrode plate comprises a current collector and a positive active material layer coated on at least one surface of the current collector, the positive active material layer comprises a positive electrode material, the positive electrode material comprises $Li_xNa_zCO_{1-y}MO_2$ with an O2 structure, wherein $0.6<x<0.85$, $0<y<0.15$, $0<z<0.03$, and M is Al and optionally at least one selected from the group consisting of Mg, Ti, Mn, Fe, Ni, Zn, Cu, Nb, Cr, and Zr;

wherein in a differential scanning calorimetry pattern of the positive electrode material, an exothermic peak exists between 330° C. and 360° C., and a full width at half maximum of the exothermic peak falls between 15° C. and 40° C., and particles of the positive electrode material comprise porous particles.

6. The electrochemical device according to claim 5, wherein in an X-ray diffraction analysis (XRD) pattern of the positive electrode material, a (002) crystal plane is located between 17.5° and 19°, and a full width at half maximum thereof falls between 0.05 and 0.1.

7. The electrochemical device according to claim 5, wherein an average particle diameter of the positive electrode material is 8 μm to 30 μm.

8. The electrochemical device according to claim 5, wherein a compacted density of the positive active material layer is 4.0 g/cm³ to 4.35 g/cm³.

9. The electrochemical device according to claim 5, wherein the positive electrode plate is configured to adopt at least one of conditions (a) to (c):

(a) in a fully discharged state after a $20^{th}$ cycle, in an X-ray diffraction analysis (XRD) pattern of the positive electrode material, two peaks appear in a range of 17° to 19°, a peak position difference between the two peaks is 0.5° to 1°, and a peak intensity ratio of a low-angle peak to a high-angle peak is 0 to 1;

(b) in a cyclic voltammetry curve of the positive electrode material between a $0^{th}$ cycle and a $100^{th}$ cycle, an oxidation peak exists between 4.45 V and 4.55 V, and a reduction peak exists between 4.55 V and 4.65 V; and (c) when voltage reaches 4.7 V during charging, a delithiation percentage of the positive electrode material exceeds 95%.

10. The electrochemical device according to claim 5, wherein the electrochemical device is configured to adopt a lithium-rich negative electrode, wherein, after charge and discharge cycles, $0.6<x<1$.

11. An electronic device, comprising an electrochemical device, wherein the electrochemical device comprises a positive electrode plate, the positive electrode plate comprises a current collector and a positive active material layer coated on at least one surface of the current collector, the positive active material layer comprises a positive electrode material, the positive electrode material comprises $Li_xNa_zCo_{1-y}MO_2$ with an O2 structure, wherein $0.6<x<0.85$, $0<y<0.15$, $0<z<0.03$, and M is Al and optionally at least one selected from the group consisting of Mg, Ti, Mn, Fe, Ni, Zn, Cu, Nb, Cr, and Zr;

wherein in a differential scanning calorimetry pattern of the positive electrode material, an exothermic peak exists between 330° C. and 360° C., and a full width at half maximum of the exothermic peak falls between 15° C. and 40° C., and particles of the positive electrode material comprise porous particles.

12. The electronic device according to claim 11, wherein in an X-ray diffraction analysis (XRD) pattern of the positive electrode material, a (002) crystal plane is located between 17.5° and 19°, and a full width at half maximum thereof falls between 0.05 and 0.1.

13. The electronic device according to claim 11, wherein a compacted density of the positive active material layer is 4.0 g/cm³ to 4.35 g/cm³.

14. The electronic device according to claim 11, wherein the positive electrode plate is configured to adopt at least one of conditions (a) to (c):

(a) in a fully discharged state after a $20^{th}$ cycle, in an X-ray diffraction analysis (XRD) pattern of the positive electrode material, two peaks appear in a range of 17° to 19°, a peak position difference between the two peaks is 0.5° to 1°, and a peak intensity ratio of a low-angle peak to a high-angle peak is 0 to 1;

(b) in a cyclic voltammetry curve of the positive electrode material between a $0^{th}$ cycle and a $100^{th}$ cycle, an oxidation peak exists between 4.45 V and 4.55 V, and a reduction peak exists between 4.55 V and 4.65 V; and (c) when voltage reaches 4.7 V during charging, a delithiation percentage of the positive electrode material exceeds 95%.

15. The positive electrode material according to claim 1, wherein M further includes at least one selected from the group consisting of Mg, Ti, Mn, Fe, Ni, Zn, Cu, Nb, Cr, and Zr.

16. The positive electrode material according to claim 11, wherein M further includes at least one selected from the group consisting of Mg, Ti, Mn, Fe, Ni, Zn, Cu, Nb, Cr, and Zr.

* * * * *